United States Patent
Boulanger-Lewandowski et al.

(10) Patent No.: US 9,721,202 B2
(45) Date of Patent: Aug. 1, 2017

(54) NON-NEGATIVE MATRIX FACTORIZATION REGULARIZED BY RECURRENT NEURAL NETWORKS FOR AUDIO PROCESSING

(71) Applicant: Adobe Systems Incorporated

(72) Inventors: Nicolas Maurice Boulanger-Lewandowski, Longueuil (CA); Gautham J. Mysore, San Francisco, CA (US); Matthew Douglas Hoffman, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 434 days.

(21) Appl. No.: 14/186,832

(22) Filed: Feb. 21, 2014

(65) Prior Publication Data
US 2015/0242180 A1    Aug. 27, 2015

(51) Int. Cl.
| G10L 21/0272 | (2013.01) |
| G10L 21/028 | (2013.01) |
| G10L 21/0308 | (2013.01) |
| G06N 3/04 | (2006.01) |

(52) U.S. Cl.
CPC .......... *G06N 3/0445* (2013.01); *G10L 21/028* (2013.01); *G10L 21/0272* (2013.01); *G10L 21/0308* (2013.01)

(58) Field of Classification Search
CPC ............ G10H 2210/056; G10L 21/028; G10L 21/0308; G10L 21/0272
See application file for complete search history.

(56) References Cited

U.S. PATENT DOCUMENTS

| 5,960,391 A * | 9/1999 | Tateishi | G10L 21/0272 704/202 |
| 2007/0030842 A1* | 2/2007 | Borden | G06K 9/6215 370/352 |
| 2013/0132085 A1* | 5/2013 | Mysore | G10L 15/144 704/256.1 |

OTHER PUBLICATIONS

Xue et al. "Survey of Distance Measures for NMF-Based Face Recognition", Computational Intelligence and Security. Springer Berlin Heidelberg, 2006.*
Bengio, et al.,' "Advances in Optimizing Recurrent Networks", in ICASSP, 2013., 2013, 5 pages.
Bengio, et al.,' "Learning Long-Term Dependencies with Gradient Descent is Difficult", IEEE Trans.on Neural Networks, vol. 5, No. 2, 1994, 35 pages.
Boulanger-Lewandowski, et al.,' "Audio Chord Recognition with Recurrent Neural Networks", in ISMIR, 2013., 2013, 6 pages.
Boulanger-Lewandowski, et al.,' "Discriminative Non-Negative Matrix Factorization for Multiple Pitch Estimation", in ISMIR, 2012, 2012, pp. 205-210.
Boulanger-Lewandowski, et al.,' "High-Dimensional Sequence Transduction", in ICASSP, 2013, 2013, 5 pages.
(Continued)

*Primary Examiner* — Samuel G Neway
(74) *Attorney, Agent, or Firm* — Wolfe-SBMC

(57) ABSTRACT

Sound processing techniques using recurrent neural networks are described. In one or more implementations, temporal dependencies are captured in sound data that are modeled through use of a recurrent neural network (RNN). The captured temporal dependencies are employed as part of feature extraction performed using nonnegative matrix factorization (NMF). One or more sound processing techniques are performed on the sound data based at least in part on the feature extraction.

21 Claims, 8 Drawing Sheets

(56) References Cited

OTHER PUBLICATIONS

Boulanger-Lewandowski, et al.,' "Modeling Temporal Dependencies in High-Dimensional Sequences: Application to Polyphonic Music Generation and Transcription", in ICML 29, 2012., 2012, 8 pages.
Cont, "Realtime multiple pitch observation using sparse non-negative constraints", in ISMIR, 2006., 2006, 6 pages.
Fevotte, "Majorization-Minimization Algorithm for Smooth Itakura-Saito Nonnegative Matrix Factorization", ICASSP, 2011., 2011, pp. 1980-1983.
Graves, et al.,' "Speech Recognition with Deep Recurrent Neural Networks", in ICASSP, 2013., 2013, 5 pages.
Hinton, "Training Products of Experts by Minimizing Contrastive Divergence", Neural Computation, vol. 14, No. 8, 2002., 2002, 19 pages.
Hoyer, "Non-negative Sparse Coding", in Neural Networks for Signal Processing, 2002, 2002, 8 pages.
Lee, et al.,' "Algorithms for Non-negative Matrix Factorization", in NIPS 13, 2001, 2001, 7 pages.
Lee, et al.,' "Learning the Parts of Objects by Non-Negative Matrix Factorization", Nature vol. 401, Oct. 21, 1999, pp. 788-791.
Lin, "Projected Gradient Methods for Non-negative Matrix Factorization", Neural computation, vol. 19, No. 10, 2007, 2007, 27 pages.
Mikolov, et al.,' "Empirical Evaluation and Combination of Advanced Language Modeling Techniques", in Interspeech, 2011, 2011, 4 pages.
Mohammadiha, et al.,' "Nonnegative HMM for Babble Noise Derived from Speech HMM: Application to Speech Enhancement", IEEE Transactions on Audio, Speech, and Language Processing, Jan. 22, 2013, 31 pages.
Mohammadiha, et al.,' "Prediction Based Filtering and Smoothing to Exploit Temporal Dependencies in NMF", in ICASSP, 2013., 2013, 5 pages.
Mysore, et al.,' "Non-Negative Hidden Markov Modeling of Audio with Application to Source Separation", International Conference on Latent Variable Analysis and Signal Separation (LVA/ICA), Sep. 2010, 8 pages.

Nakano, et al.,' "Nonnegative Matrix Factorization with Markov-chained Bases for Modeling Time-varying patterns in Music Spectrograms", in LVA/ICA, 2010., 2010, 8 pages.
Nam, et al.,' "Sound Recognition in Mixtures", in LVA/ICA, 2012., 2012, 8 pages.
Ozerov, et al.,' "Factorial Scaled Hidden Markov Model for Polyphonic Audio Representation and Source Separation", IEEE Workshop on Applications of Signal Processing to Audio and Acoustics, Oct. 18, 2009, pp. 121-124.
Rumelhart, et al.,' "Learning Internal Representations by Error Propagation", in Parallel Dist. Proceedings, MIT Press, 1986., 1986, pp. 318-362.
Smaragdis, "Supervised and Semi-Supervised Separation of Sounds from Single-Channel Mixtures", ICA'07 Proceedings of the 7th international conference on Independent component analysis and signal separation, 2007, 8 pages.
Sun, et al.,' "Universal Speech Models for Speaker Independent Single Channel Source Separation", in ICASSP, 2013., 2013, 8 pages.
Sutskever, et al.,' "The Recurrent Temporal Restricted Boltzmann Machine", in NIPS 20, 2008, 2008, 8 pages.
Uria, et al.,' "RNADE: The real-valued neural autoregressive density-estimator", in NIPS 26, 2013., Jun. 2, 2013, 12 pages.
Vincent, et al.,' "Adaptive Harmonic Spectral Decomposition for Multiple Pitch Estimation", IEEE Trans. on Audio, Speech, and Lang. Proc., vol. 18, No. 3, 2010, 9 pages.
Vincent, et al.,' "Performance Measurement in Blind Audio Source Separation", IEEE TASLP, 14(4), Jul. 2006, 9 pages.
Virtanen, "Monaural sound source separation by nonnegative matrix factorization with temporal continuity and sparseness criteria", Audio, Speech, and Language Processing, IEEE Transactions on, vol. 15, No. 3, 2007., Mar. 2007, pp. 1066-1074.
Welling, et al.,' "Exponential Family Harmoniums with an Application to Information Retrieval", in NIPS 17, 2005, 2005, 8 pages.
Wilson, et al.,' "Regularized Non-negative Matrix Factorization with Temporal Dependencies for Speech Denoising", in Interspeech, 2008., 2008, 4 pages.

* cited by examiner (a) Source 1

(b) Source 2

(c) Estimated 1, NMF (d) Estimated 2, NMF (e) Estimated 1, RNN (f) Estimated 2, RNN

| Model | SDR | | SIR | | SAR | |
|---|---|---|---|---|---|---|
| | acc. | sing. | acc. | sing. | acc. | sing. |
| NMF | 5.04 | 5.05 | 7.75 | 7.59 | 10.00 | 10.25 |
| NMF-sm | 6.08 | 5.59 | 8.77 | 7.42 | 10.96 | 11.93 |
| RNN | 6.13 | 5.80 | 9.46 | 7.79 | 10.34 | 11.52 |
| RNN-RBM | 6.83 | 7.12 | 11.25 | 9.75 | 9.86 | 11.52 |
| NMF | 5.20 | 3.58 | 9.54 | 4.95 | 8.80 | 11.43 |
| NMF-sm | 5.57 | 3.71 | 9.48 | 4.94 | 9.57 | 11.84 |
| RNN | 5.94 | 3.70 | 10.49 | 4.86 | 9.36 | 12.07 |
| RNN-RBM | 6.16 | 5.05 | 11.81 | 7.12 | 9.04 | 10.59 |

NON-NEGATIVE MATRIX FACTORIZATION REGULARIZED BY RECURRENT NEURAL NETWORKS FOR AUDIO PROCESSING

BACKGROUND

Sound processing may be utilized to provide a wide range of functionality. One example of this functionality is sound decomposition, which may be leveraged to identify sources of sound data in a recording. For example, sound data may be captured for use as part of a movie, recording of a song, and so on. Parts of the sound data, however, may reflect capture in a noisy environment or may include different parts that are and are not desirable. The sound data, for instance, may include dialog for a movie which is desirable, but may also include sound data of an unintended ringing of a cell phone. Accordingly, the sound data may be decomposed according to different sources such that the sound data corresponding to the dialog may be separated from the sound data that corresponds to the cell phone.

However, conventional techniques that are employed to automatically perform this decomposition could result in inaccuracies as well as be resource intensive. For example, conventional techniques typically did not address a temporal evolution of sound from different sources and thus ignored temporal characteristics of the sound from the respective sources, which could result in mislabeling of portions of the sound data.

SUMMARY

Nonnegative matrix factorization techniques using recurrent neural networks are described. In one or more implementations, temporal dependencies are captured in sound data that are modeled through use of a recurrent neural network (RNN). The captured temporal dependencies are employed as part of feature extraction performed using nonnegative matrix factorization (NMF). One or more sound processing techniques are performed on the sound data based at least in part on the feature extraction.

In one or more implementations, global temporal information in sound data is captured and the captured global temporal information is employed as part of nonnegative matrix factorization in which a Cosine distance is utilized as a cost distance in nonnegative matrix factorization to generate a likelihood that a respective sound source generated a respective portion of the sound data. One or more sound processing techniques are performed on the sound data based at least in part on the generated likelihoods that the respective sound sources generated respective portions of the sound data as a result of the nonnegative matrix factorization.

In one or more implementations, a system includes one or more computing devices configured to perform operations comprising employing time-dependent restricted Boltzmann machines (RBM) as part of a recurrent neural network (RNN) to obtain temporal information from sound data and using the temporal information as part of feature extraction of the sound data.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Sound processing may be utilized to support a variety of functionality, such as sound decomposition which is also referred to as audio source separation. Audio source separation involves isolation of individual components that compose an audio signal, such as speech, singing voice and music tracks. Non-negative matrix factorization (NMF) is an example of a technique that may be used to decompose a magnitude spectrogram into its underlying components. However, NMF decomposition is typically based on the content of each time frame in the spectrogram, and generally ignores the temporal evolution of each source. Although some conventional extensions of NMF may consider temporal dependencies, such as temporal smoothing, Kalman filter or Markov chain modeling, these extensions are generally limited to use for short term temporal dependencies and thus fail to take long-term temporal dependencies into account.

Sound processing techniques using recurrent neural networks are described. The techniques described herein may be utilized to exploit long-term temporal information and context of sound data to improve the separation of sources in complex audio mixtures using non-negative matrix factorization. A recurrent neural network, for instance, may be trained to capture long-term temporal dependencies and event co-occurrence in the sound data. This supports an ability to disambiguate audio signals, such as speech, singing voice and music from noise and interference.

For example, a recurrent neural network (RNN) may be trained to estimate the density of activity matrices produced as part of nonnegative matrix factorization. This RNN is able to predict if a given decomposition is plausible, or likely, given the examples observed in the training data. Thus, the RNN's predictions may be incorporated inside the NMF decomposition to obtain features having increased relevancy. The long-term temporal information and context taken into account by the RNN improves the relevance of the obtained NMF decomposition, which in turn can be used to support a variety of sound processing techniques in additional to sound decomposition (e.g., audio source separation), such as detection, temporal imputation, enhancement and synthesis, and so forth by capturing long-term temporal dependencies and context into NMF feature extraction.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
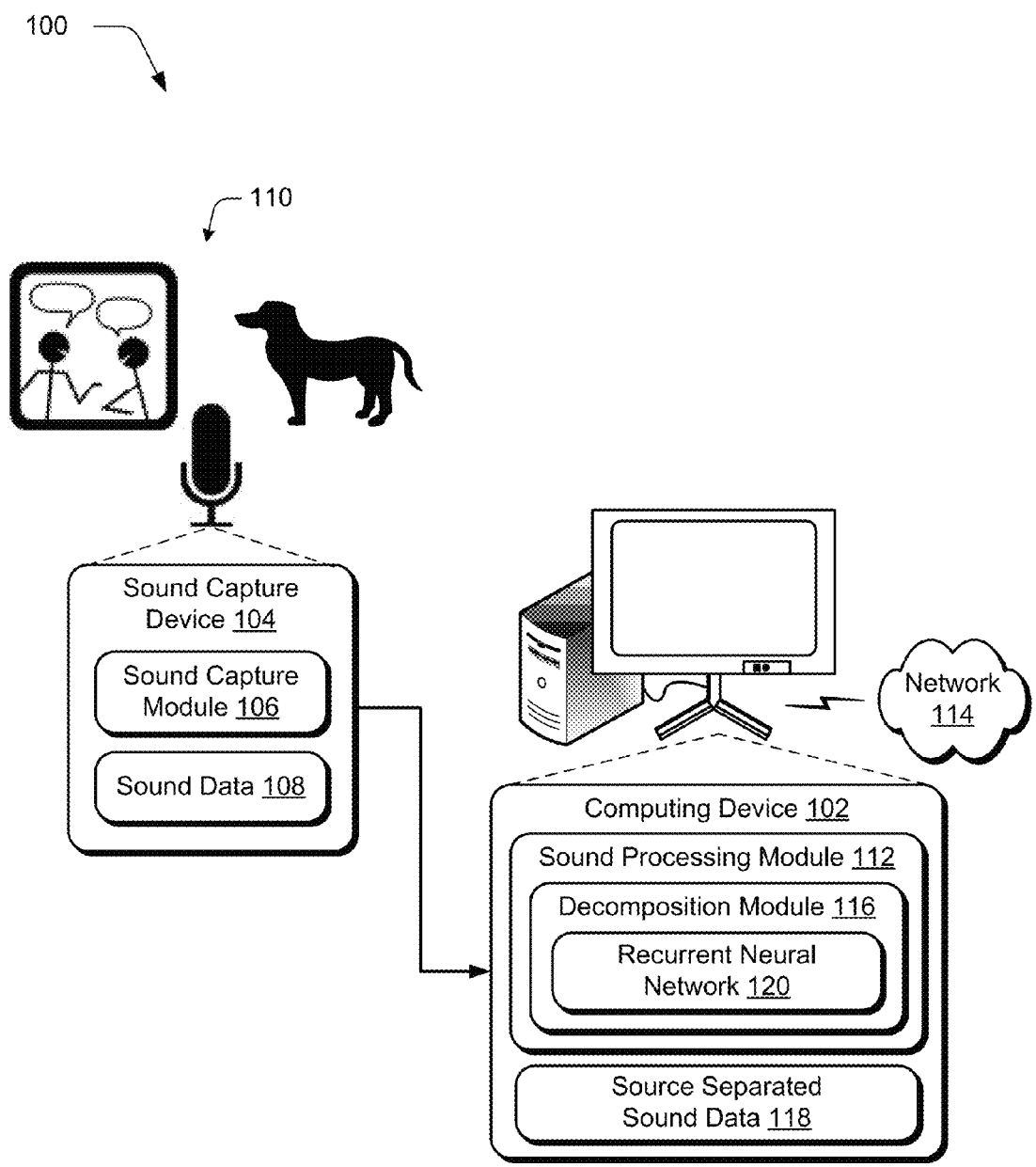
FIG. 1 is an illustration of an environment in an example implementation that is operable to employ sound processing techniques as described herein.

FIG. 1 is an illustration of an environment 100 in an example implementation that is operable to employ sound decomposition techniques described herein. The illustrated environment 100 includes a computing device 102 and sound capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 8.

The sound capture device 104 may also be configured in a variety of ways. Illustrated examples of one such configuration involves a standalone device but other configurations are also contemplated, such as part of a mobile phone, video camera, tablet computer, part of a desktop microphone, array microphone, and so on. Additionally, although the sound capture device 104 is illustrated separately from the computing device 102, the sound capture device 104 may be configured as part of the computing device 102, the sound capture device 104 may be representative of a plurality of sound capture devices, and so on.

The sound capture device 104 is illustrated as including a respective sound capture module 106 that is representative of functionality to generate sound data 108. The sound capture device 104, for instance, may generate the sound data 108 as a recording of an audio scene 110 having one or more sources. This sound data 108 may then be obtained by the computing device 102 for processing.

The computing device 102 is illustrated as including a sound processing module 112. The sound processing module is representative of functionality to process the sound data 108. Although illustrated as part of the computing device 102, functionality represented by the sound processing module 112 may be further divided, such as to be performed "over the cloud" via a network 114 connection, further discussion of which may be found in relation to FIG. 8.

An example of functionality of the sound processing module 112 is represented as a decomposition module 116. The decomposition module 116 is representative of functionality to decompose the sound data 108 according to a likely source of the data. As illustrated in the audio scene 110 of FIG. 1, for instance, the decomposition module 116 may process the sound data 108 to separate sound data of two users talking from the barking of a dog to form the source separated sound data 118. This may be used to support a variety of different functionality, such as audio denoising, music transcription, music remixing, audio-based forensics, and so on.

The decomposition module 116 is also illustrated as including a recurrent neural network 120 module. The recurrent neural network (RNN) 120 module is representative of functionality to capture long-term temporal dependencies and event co-occurrence in the sound data 108 using a RNN. This information may be leveraged as high-level temporal information during feature extraction from audio signals via non-negative matrix factorization and thus may operate contrary to conventional approaches that impose local temporal constraints. Thus, this technique supports the ability to "fill in the blanks" during feature extraction from complex audio mixtures which may be applied to a variety of different sound processing techniques. Therefore, although the following examples describe sound decomposition it should be readily apparent that a wide variety of sound processing techniques may also leverage a recurrent neural network 120 without departing from the spirit and scope thereof.

Figure 2:
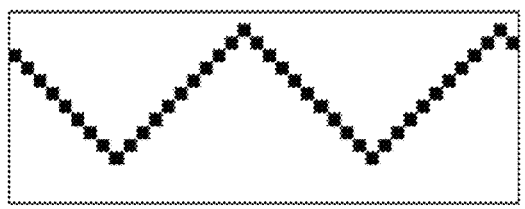
FIG. 2 depicts an example implementation showing a comparison of a sound decomposition technique using nonnegative matrix factorization (NMF) with a recurrent neural network (RNN) technique.
Figure 2:
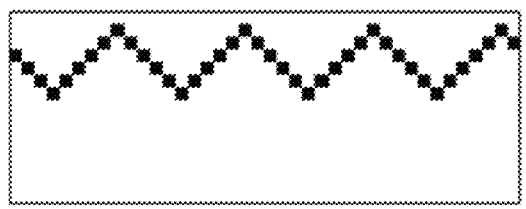
Figure 2:
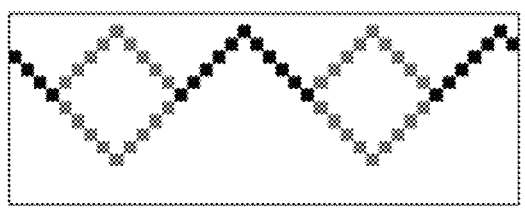
Figure 2:
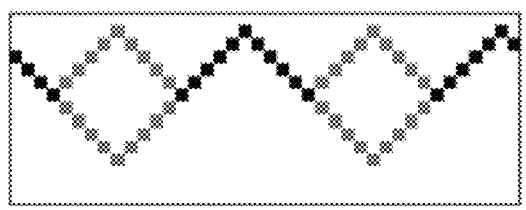
Figure 2:
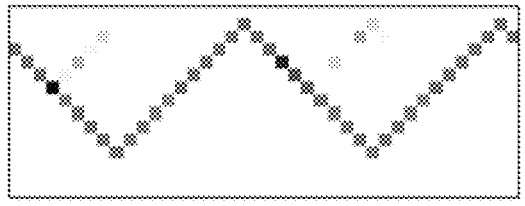
Figure 2:
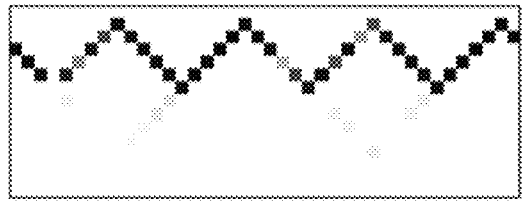

FIG. 2 depicts an example implementation 200 showing a comparison of a sound decomposition technique using nonnegative matrix factorization (NMF) with a recurrent neural network (RNN) technique. Two synthetic datasets are illustrated as "Source 1" and "Source 2" at Sections (a) and (b), respectively, that may be included in a single instance of sound data 108 captured by the sound capture device 104. Each of these synthetic datasets is configured as having a saw tooth waveform having different amplitudes and are randomly shifted along both dimensions. A waveform of "Source 1," for instance exhibits a greater variability in amplitude over a longer period of time than the waveform of "Source 2."

In the examples shown in Sections (c) and (d), results of source separation are shown as performed using NMF. As illustrated, because NMF imposes local temporal constraints (e.g., use "per frame") each of the results includes sound from both sound sources. However, as shown in Sections (e) and (f), long-term temporal dependencies as captured through use of a recurrent neural network (RNN) and thus the results of source separation shown in the respective sections has increased accuracy. Further discussion of use of recurrent neural networks may be found in the following description and corresponding figures.

Figure 3:
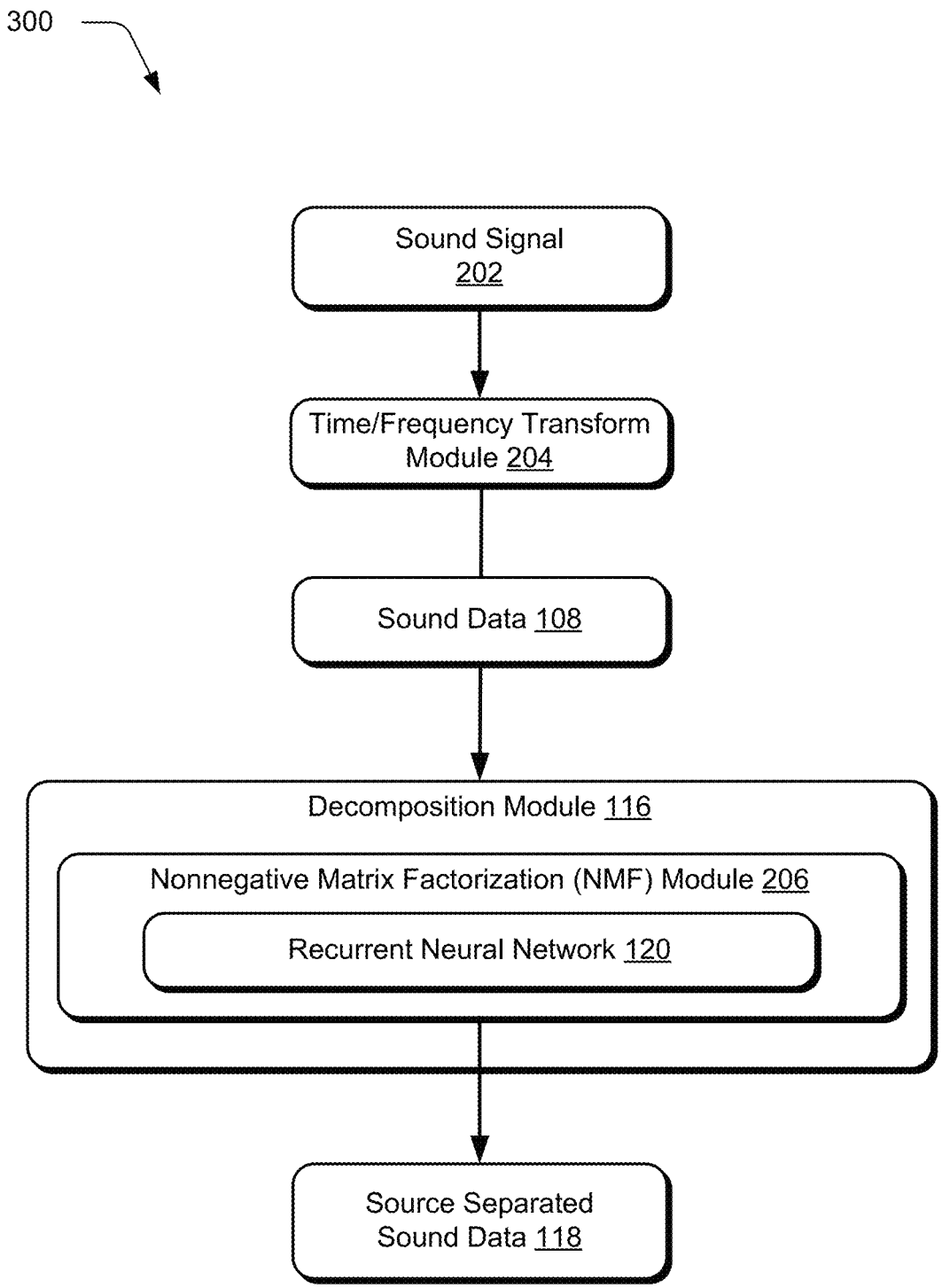
FIG. 3 depicts a system in an example implementation in which source separated sound data is generated from sound data from FIG. 1 through use of a decomposition module.

FIG. 3 depicts a system 300 in an example implementation in which source separated sound data 120 is generated from sound data 108 from FIG. 1 through use of a decomposition module 116. A sound signal 202 is processed by a time/frequency transform module 204 to create sound data 108, which may be configured in a variety of ways.

The sound data 108, for instance, may be used to form one or more spectrograms of a respective signal. For example, a time-domain signal may be received and processed to produce a time-frequency representation, e.g., a spectrogram, which may be output in a user interface 118 for viewing by a user. Other representations are also contemplated, such as a time domain representation, an original time domain signal, and so on.

Spectrograms may be generated in a variety of ways, an example of which includes calculation as magnitudes of short time Fourier transforms (STFT) of the signals. Additionally, the spectrograms may assume a variety of configurations, such as narrowband spectrograms (e.g., 32 ms windows) although other instances are also contemplated. The STFT sub-bands may be combined in a way so as to approximate logarithmically-spaced or other nonlinearly-spaced sub-bands.

The sound data 108 may then be received by the decomposition module 116 for processing. As part of this processing, a nonnegative matrix factorization module 210 may be utilized that is representative of functionality to perform nonnegative matrix factorization. Non-negative matrix factorization (NMF) may be employed by the module as part of an unsupervised technique to discover parts-based representations underlying non-negative data generated from sound data 108. When applied to the magnitude spectrogram of an audio signal, for instance, NMF may be used to discover a basis of interpretable recurring events and associated time-varying encodings, or activities, that together reconstruct the original spectrogram. In addition to accurate reconstruction, it may be useful to enforce various constraints to influence the decomposition. Conventionally, however, those constraints generally act independently on each time frame.

In the following, an expressive connectionist model is leveraged using a recurrent neural network 120 to describe long-term dependencies and high-level structure in the sound data 108. Recurrent neural networks (RNN) are powerful dynamical systems that incorporate an internal memory, or hidden state, represented by a self-connected layer of neurons. Recurrent neural networks (RNNs), for instance, may utilize the self-connected layer of neurons to form a directed cycle to maintain an internal state that allows it to exhibit dynamic temporal behavior. This property makes them well suited to model temporal sequences, such as frames in a magnitude spectrogram or feature vectors in an activity matrix, by being trained to predict the output at the next time step given the previous time steps.

RNNs are completely general in that in principle the networks may describe arbitrarily complex long-term temporal dependencies, which has made the RNNs successful in music, language and speech applications. For example, these long-term temporal dependencies may define relationships between portions of the sound data over a "long term" that includes more than just a current frame or even a frame that immediately precedes the current frame. One extension of the RNN, referred to as "RNN-RBM," employs time-dependent restricted Boltzmann machines (RBM) to describe the multimodal conditional densities typically present in audio signals, which may result in significant improvements over N-gram and hidden Markov model (HMM) baselines. In the following, RNNs 120 are incorporated into the NMF framework of the NMF module 206 in order to model sound mixtures to generate source separated sound data 118. However, as previously described these techniques are equally applicable to a variety of other sound processing techniques.

Further discussion may be found in relation to the following sections. First, NMF and RNN models are introduced in corresponding sections. A discussion then follows in which temporal constraints are incorporated as a part of feature extraction. A description of methodology and results then follows in corresponding sections.

Non-negative Matrix Factorization

NMF techniques may be utilized to discover an approximate factorization of an input matrix "X":

$$\overset{N \times T}{X} \simeq \overset{N \times T}{\Lambda} \equiv \overset{N \times K}{W} \cdot \overset{K \times T}{H}, \quad (1)$$

where "X" is the observed magnitude spectrogram with time and frequency dimensions "T" and "N" respectively, "Λ" is the reconstructed spectrogram, "W" is a dictionary matrix of "K" basis spectra and "H" is the activity matrix. Non-negativity constraints "$W_{nk} \geq 0$, $H_{kt} \geq 0$" apply on both of the matrices. NMF seeks to minimize the reconstruction error, which is a distortion measure between the observed spectrogram "X" and the reconstruction "Λ." One choice to perform this is a generalized Kullback-Leibler divergence, which may be expressed as follows:

$$C_{KL} \equiv \sum_{nt} \left( X_{nt} \log \frac{X_{nt}}{\Lambda_{nt}} - X_{nt} + \Lambda_{nt} \right). \quad (2)$$

Minimizing "$C_{KL}$" may be achieved by alternating multiplicative updates to "H" and "W" as follows:

$$H \leftarrow H \circ \frac{W^T(X/\Lambda)}{W^T 11^T} \quad (3)$$

$$W \leftarrow W \circ \frac{(X/\Lambda)H^T}{11^T H^T}, \quad (4)$$

where "1" is a vector of ones, the "∘" operator denotes element-wise multiplication, and division is also element-wise. These updates are guaranteed to converge to a stationary point of the reconstruction error.

In one or more implementations, an assumption may be made that active elements "$H_{kt}$" are to be limited to a small subset of the available basis spectra. To encourage this behavior, a sparsity penalty "$C_S \equiv \lambda |H|$" may be added to the total NMF objective, where "|•|" denotes the "$L_1$" norm and "λ" specifies the relative importance of sparsity. In that context, the constraint that the basis spectra have unit norm may be imposed and thus Equation (3) becomes:

$$H \leftarrow H \circ \frac{W^T(X/\Lambda)}{1+\lambda}, \quad (5)$$

and the multiplicative update to "W" (e.g., Equation 4) is replaced by projected gradient descent as follows:

$$W \leftarrow W - \mu(1 - X/\Lambda)H^T \quad (6)$$

$$W_{nk} \leftarrow \max(W_{nk}, 0), W_k \leftarrow \frac{W_k}{|W_k|}, \quad (7)$$

where "$W_{\cdot k}$" is the "k-th" column of "W" and "μ" is the learning rate.

Recurrent Neural Networks 120

The RNN 120 may formally define a distribution of a vector sequence "$v \equiv \{v^{(t)} \in \mathbb{R}_0^{+K}, 1 \leq t \leq T\}$" of length T as follows:

$$P(v) = \prod_{t=1}^{T} P(v^{(t)} | A^{(t)}), \quad (8)$$

where "$A^{(t)} \equiv \{v^{(\tau)} | \tau < t\}$" is the sequence history at time "t," and "$P(v^{(t)}|A^{(t)})$" is the conditional probability of observing $v^{(t)}$ according to the model, defined below. A single-layer RNN with hidden units "$\hat{h}^{(t)}$" is defined by its recurrence relation:

$$\hat{h}^{(t)} = \sigma(W_{vh} v^{(t)} + W_{\hat{h}\hat{h}} \hat{h}^{(t-1)} + b_{\hat{h}}), \quad (9)$$

where "$\sigma(x) \equiv (1+e^{-x})^{-1}$" is the element-wise logistic sigmoid function, "$W_{xy}$" is the weight matrix tying vectors "x," "y," and "$b_x$" is the bias vector associated with "x."

The model is trained to predict the observation "$v^{(t)}$" at time step "t" given the previous ones "$A^{(t)}$." The prediction "$y^{(t)}$" is obtained from the hidden units at the previous time step "$\hat{h}^{(t-1)}$", which may be expressed as follows:

$$y^{(t)} = o(W_{\hat{h}v} \hat{h}^{(t-1)} + b_v), \quad (10)$$

where "o(a)" is the output non-linearity function of an activation vector "a," and is to be as close as possible to the target vector "$v^{(t)}$." When the target is a non-negative real-valued vector, the likelihood of an observation may be given as follows:

$$P(v^{(t)} | A^{(t)}) \propto \frac{v^{(t)} \cdot y^{(t)}}{|v^{(t)}| \cdot |y^{(t)}|} \quad (11)$$

$$o(a)_k = \exp(a_k). \quad (12)$$

Other forms for "P" and "o" are also possible. Use of a cosine distance combined with an exponential non-linearity have been found to work well in practice, which may be because predicting the orientation of a vector may be easier for an RNN than predicting its magnitude.

Figure 4:
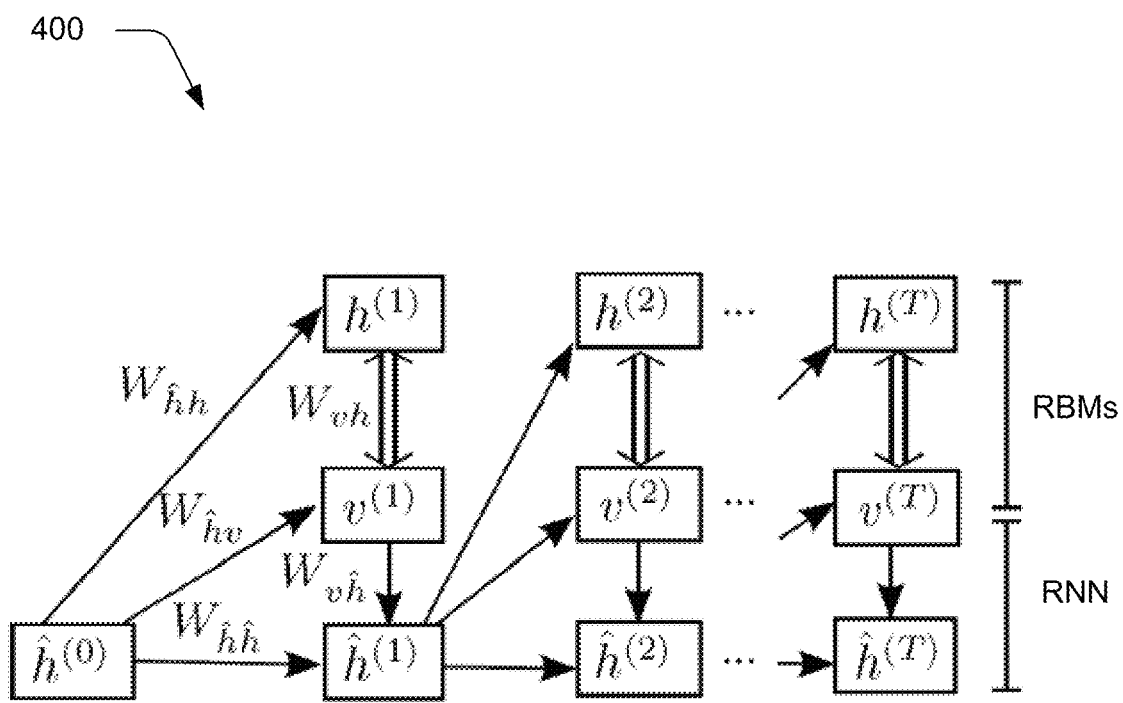
FIG. 4 depicts an example showing an approach to capture higher-order dependencies between output variables through use an output probability model such as a restricted Boltzmann machine.

When the output observations are multivariate, another approach is to capture the higher-order dependencies between the output variables using an output probability model such as an RBM, resulting in RNN-RBM as illustrated in the example 400 in FIG. 4. The Gaussian RBM variant is typically used to estimate the density of real-valued variables "$v^{(t)}$." In this case, the RNN's task is to predict the parameters of the conditional distribution, i.e. the RBM biases at time step "t":

$$b_v^{(t)} = b_v + W_{\hat{h}v} \hat{h}^{(t-1)} \quad (13)$$

$$b_h^{(t)} = b_h + W_{\hat{h}h} \hat{h}^{(t-1)}. \quad (14)$$

In an RBM, the likelihood of an observation is related to the free energy "$(v^{(t)})$" by $P(v^{(t)}|A^{(t)}) \propto e^{-F(v^{(t)})}$" and may be expressed as follows:

$$F(v^{(t)}) \equiv \frac{1}{2} \|v^{(t)}\|^2 - b_v^{(t)} \cdot v^{(t)} - |s(b_h^{(t)} + W_{vh} v^{(t)})|, \quad (15)$$

where "$s(x) \equiv \log(1+e^x)$" is the element-wise softplus function and "$W_{vh}$" is the weight matrix of the RBM. The log-likelihood gradient with respect to the RBM parameters is generally intractable due to the normalization constant but may be estimated by contrastive divergence.

The RNN model may be trained by minimizing a negative log-likelihood of the sound data 108 as follows:

$$C_{RNN}(v) = -\sum_{t=1}^{T} \log P(v^{(t)} | A^{(t)}). \quad (16)$$

whose gradient with respect to the RNN parameters is obtained by back propagation through time (BPTT). Several strategies may be used to reduce difficulties associated with gradient-based learning in RNNs including gradient clipping, sparsity and momentum techniques.

Temporally Constrained NMF

In this section, RNN regularization is incorporated into the NMF framework to temporally constrain the activity matrix "H" during decomposition of the sound data 108. A simple form of regularization that encourages neighboring activity coefficients to be close to each other is temporal smoothing, an example of which is expressed as follows:

$$C_{TS} = \frac{1}{2} \beta \sum_{t=1}^{T-1} \|H_{:,t} - H_{:,t+1}\|^2, \quad (17)$$

where the hyperparameter "β" is a weighting coefficient.

In the following model, the RNN negative log-likelihood term from Equation 16 with "$v := \{H_{:,t}, 1 \leq t \leq T\}$" is added to the total NMF cost as follows:

$$C = C_{KL} + C_S + C_{TS} + C_{L2} + \alpha C_{RNN}(H). \quad (18)$$

where

"$C_{L2} \equiv \frac{1}{2} \eta \|H\|^2$"

provides "$L_2$" regularization, and the hyperparameters "η, α" specify the relative importance of each prior. This framework corresponds to an RNN generative model at temperature "α" describing the evolution of the latent variable "$H_{:,t}$" and the observation "$X_{:,t}$" at time "t" being conditioned on "$H_{:,t}$" via the reconstruction error "$C_{KL}$." The overall graphical model may be seen as a generalization of a non-negative hidden Markov model (N-HMM).

The NMF model is first trained by alternating updates and extracting activity features H. The RNN 120 is then trained to minimize "$C_{RNN}(H)$" by stochastic gradient descent. During supervised NMF, the activity matrix "H" is inferred that minimizes the total cost (e.g., Equation 18) given a pre-trained dictionary "W" and a test observation "X." In the following, the multiplicative update of Equation (5) is replaced with a gradient descent update:

$$H \leftarrow H - \mu \left[ W^T (1 - X/\Lambda) + \lambda + \eta H + \frac{\partial C_{TS}}{\partial H} + \alpha \frac{\partial C_{RNN}}{\partial H} \right] \quad (19)$$

where gradient of "$C_{TS}$" is given by:

$$\frac{\partial C_{TS}}{\partial H_{kt}} = \beta \begin{cases} H_{kt} - H_{k(t+1)} & \text{if } t = 1 \\ 2H_{kt} - H_{k(t-1)} - H_{k(t+1)} & \text{if } 1 < t < T. \\ H_{kt} - H_{k(t-1)} & \text{if } t = T \end{cases} \quad (20)$$

When deriving "$\partial C_{RN\;N}/\partial H$," "$H_{:t}$" affects the cost directly by matching the prediction "$y^{(t)}$" in Equation (11), and also indirectly by influencing the future predictions of the RNN via "$A^{(t+\delta t)}$." By fully backpropagating the gradient through time, future observations "$X_{:(t+\delta t)}$" may be taken into account when updating "$H_{:t}$". While other conventional approaches involve sophisticated inference procedures, the search for a globally optimal "H" may be facilitated by using gradient descent when the inferred variables are real-valued.

The RNN-RBM involves a different approach due to the intractable partition function of the "$t^{th}$" RBM that varies with "$A^{(t)}$." The retained strategy is to consider "$A^{(t)}$" fixed during inference and to approximate the gradient of the cost as follows:

$$\frac{C_{RNN}}{\partial v^{(t)}} \simeq \frac{\partial F(v^{(t)})}{\partial v^{(t)}} = v^{(t)} - b_v^{(t)} - \sigma(b)_h^{(t)} + W_{vh}v^{(t)})W_{vh}^T. \quad (21)$$

Since this approach may be unstable, the value of "$A^{(t)}$" may be updated every "in" iterations of gradient descent (e.g., m=10) and an RNN 120 may be used in conjunction with the RNN-RBM to exploit its tractability and norm independence properties.

Evaluation and Results

In this section, the performance of an example of the RNN model is evaluated on a source separation task in comparison with a traditional NMF baseline and NMF with temporal smoothing. Source separation is interesting for testing purposes because, contrary to purely discriminative tasks such as multiple pitch estimation or chord estimation where RNNs are known to outperform other models, source separation involves accurate signal reconstruction.

Supervised and semi-supervised NMF algorithms are considered that involve training sub-models on isolated sources before concatenating the pre-trained dictionaries and feeding the relevant activity coefficients into the associated temporal model. Final source estimates are obtained by separately reconstructing the part of the observation explained by each sub-model. In the semi-supervised setting, an additional dictionary is trained from scratch for each new examined sequence and no temporal model is used for the unsupervised channel. Wiener filtering is used as a final step to ensure that the estimated source spectrograms "$X^{(i)}$" add up to the original mixture "X" as follows:

$$\hat{X}^{(i)} = \frac{X^{(i)}}{\sum_j X^{(j)}} \circ X, \quad (22)$$

before transforming each source in the time domain via the inverse short-term Fourier transform (STFT).

In one example, a MIR-1K dataset is employed that includes nineteen sound sources (e.g., singers) performing a total of 1,000 Chinese pop karaoke song excerpts, ranging from 4 to 13 seconds and recorded at 16 kHz. For each singer, the available tracks are randomly split into training, validation and test sets in an "8:1:1" ratio. The accompaniment music and singing voice channels are summed directly at their original loudness, e.g., ~0 dB. The magnitude spectrogram "X" is computed by the STFT using a 64 millisecond sliding Blackman window with hop size of thirty milliseconds and zero-padded to produce a feature vector having a length of nine hundred at each time step.

The source separation quality is evaluated using a BSS Eval toolbox that employs standard metrics SDR, SIR and SAR that measure for each channel the ratios of source to distortion, interference and artifacts respectively. For each model and singer combination, a random search on predefined intervals is used to select the hyper parameters that maximize the mean SDR on the validation set and final performance is reported on the test set.

Reference will now be made again to FIG. 2 to illustrate the effectiveness of a temporally constrained model. Source separation experiments are performed on a synthetic dataset of two saw tooth wave sources of different amplitudes and randomly shifted along both dimensions. FIG. 2 shows an example of such sources in Sections (a) and (b) along with the sources estimated by supervised NMF with either no temporal constraint (e.g., Sections (c) and (d)) or with an RNN with the cosine distance cost (e.g., Sections (e) and (f)). While this problem is provably unsolvable for NMF alone or with simple temporal smoothing (e.g., Equation. 17), the RNN-constrained model successfully separates the two mixed sources. Thus, this example demonstrates advantages of use of temporal constraints when the content of each time frame is not sufficient to distinguish each sound source.

Figure 5:
FIG. 5 depicts examples of source separation results for supervised and semi-supervised nonnegative matrix factorization.

Examples 500 of source separation results on the MIR-1K dataset are presented in FIG. 5 for supervised (top) and semi-supervised (bottom) NMF (K=15). As can be observed from the table, the RNN-based models outperform the baselines in SDR and SIR for both sources with a moderate degradation in SAR.

As described above, a framework has been presented to leverage high-level information during feature extraction by incorporating an RNN-based prior inside the NMF decomposition. While the combined approach surpasses the baselines in realistic audio source separation settings, it may be further improved by employing a deep bidirectional RNN with multiplicative gates, replacing the Gaussian RBMs with a tractable distribution estimator for real-valued vectors RNADE, implementing an EM-like algorithm to jointly train the NMF and RNN models, and transitioning to a universal speech model for singer-independent source separation. Further discussion of this framework may be found in relation to the following procedures.

Example Procedures

The following discussion describes sound processing techniques using recurrent neural networks that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
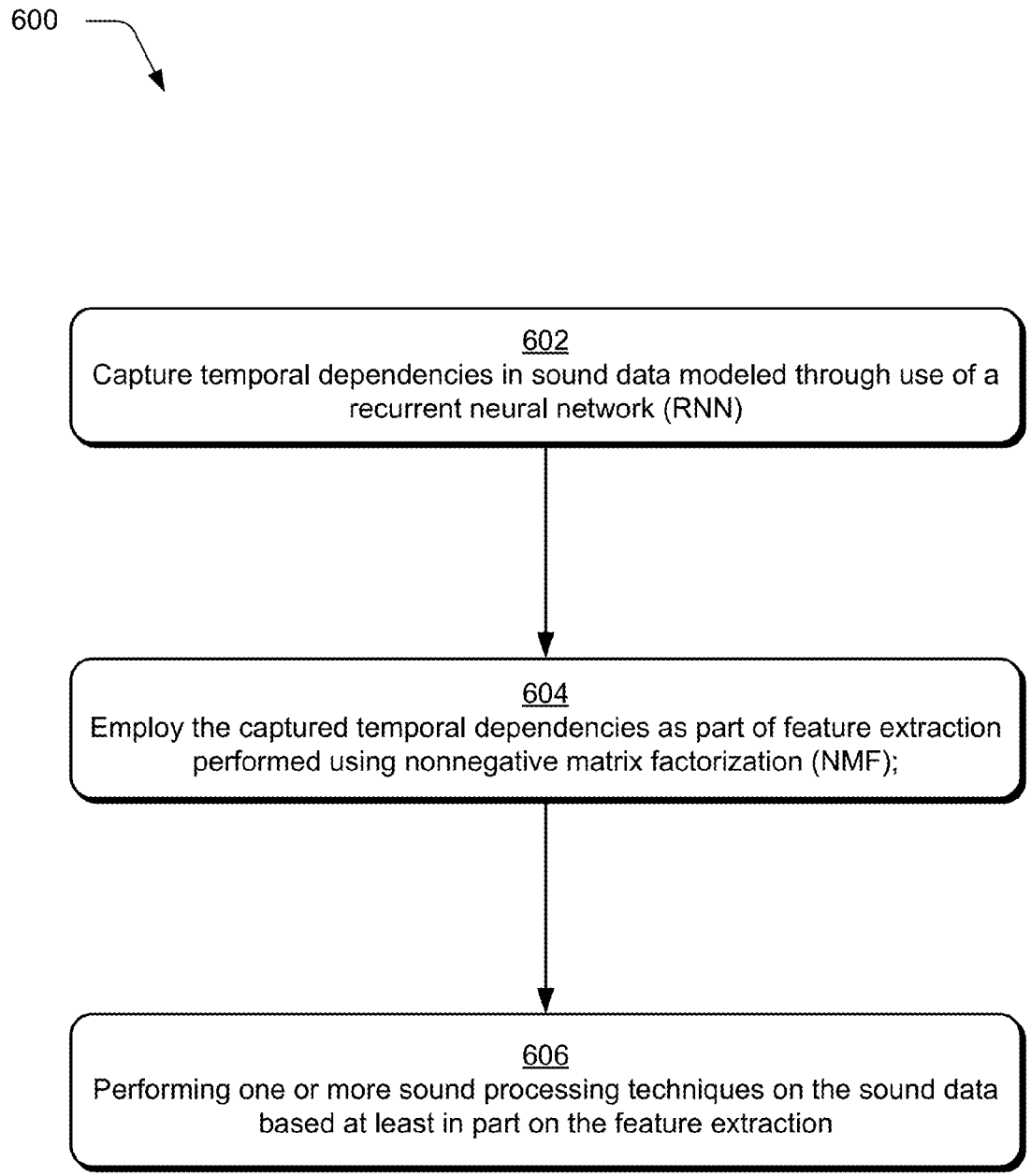
FIG. 6 is a flow diagram depicting a procedure in an example implementation in which recurrent neural networks are used as part of feature extraction performed using nonnegative matrix factorization.

FIG. 6 depicts a procedure 600 in an example implementation in which recurrent neural networks are used as part of feature extraction performed using nonnegative matrix factorization. Temporal dependencies are captured in sound data that are modeled through use of a recurrent neural network (RNN) (block 602). The temporal dependencies, for instance, may describe high-level temporal information including event co-occurrence.

The captured temporal dependencies are employed as part of feature extraction performed using nonnegative matrix factorization (NMF) (block 604). Continuing with the previous example, the temporal dependencies may be used to "fill in the blanks" during feature extraction performed using NMF.

One or more sound processing techniques are performed on the sound data based at least in part on the feature extraction (block 606). A variety of different sound processing techniques may be employed, such as sound decomposition, audio source separation, sound detection, temporal imputation, sound enhancement, or sound synthesis.

Figure 7:
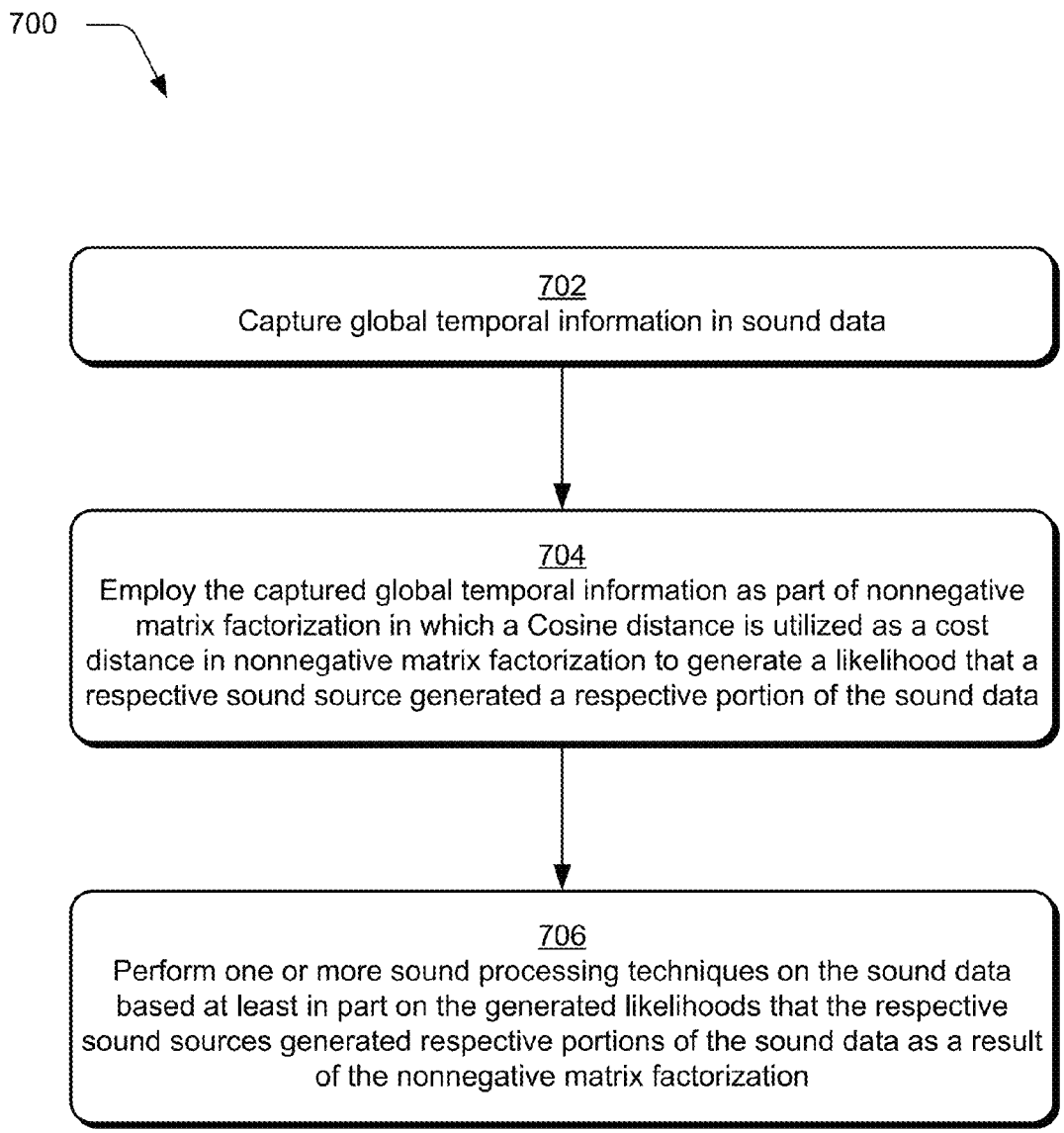
FIG. 7 is a flow diagram depicting a procedure in an example implementation in which global temporal information is employed as part of nonnegative matrix factorization in which a cost distance is utilized to generate a likelihood that a respective sound source generated a respective portion of sound data.

FIG. 7 depicts a procedure 700 in an example implementation in which global temporal information is employed as part of nonnegative matrix factorization in which a cost distance is utilized to generate a likelihood that a respective sound source generated a respective portion of sound data. Global temporal information in sound data is captured (block 702) and the captured global temporal information is employed as part of nonnegative matrix factorization in which a Cosine distance is utilized as a cost distance in nonnegative matrix factorization to generate a likelihood that a respective sound source generated a respective portion of the sound data (block 704). As described in relation to Equations (11) and (12) above, the global temporal information (e.g., describing a plurality of frames in sound data 108) may be utilized to predict an observation given previous observations at previous frames in the sound data.

One or more sound processing techniques are performed on the sound data based at least in part on the generated likelihoods that the respective sound sources generated respective portions of the sound data as a result of the nonnegative matrix factorization (block 706). As previously described, a variety of different sound processing techniques may be employed, such as sound decomposition, audio source separation, sound detection, temporal imputation, sound enhancement, or sound synthesis.

Example System and Device

Figure 8:
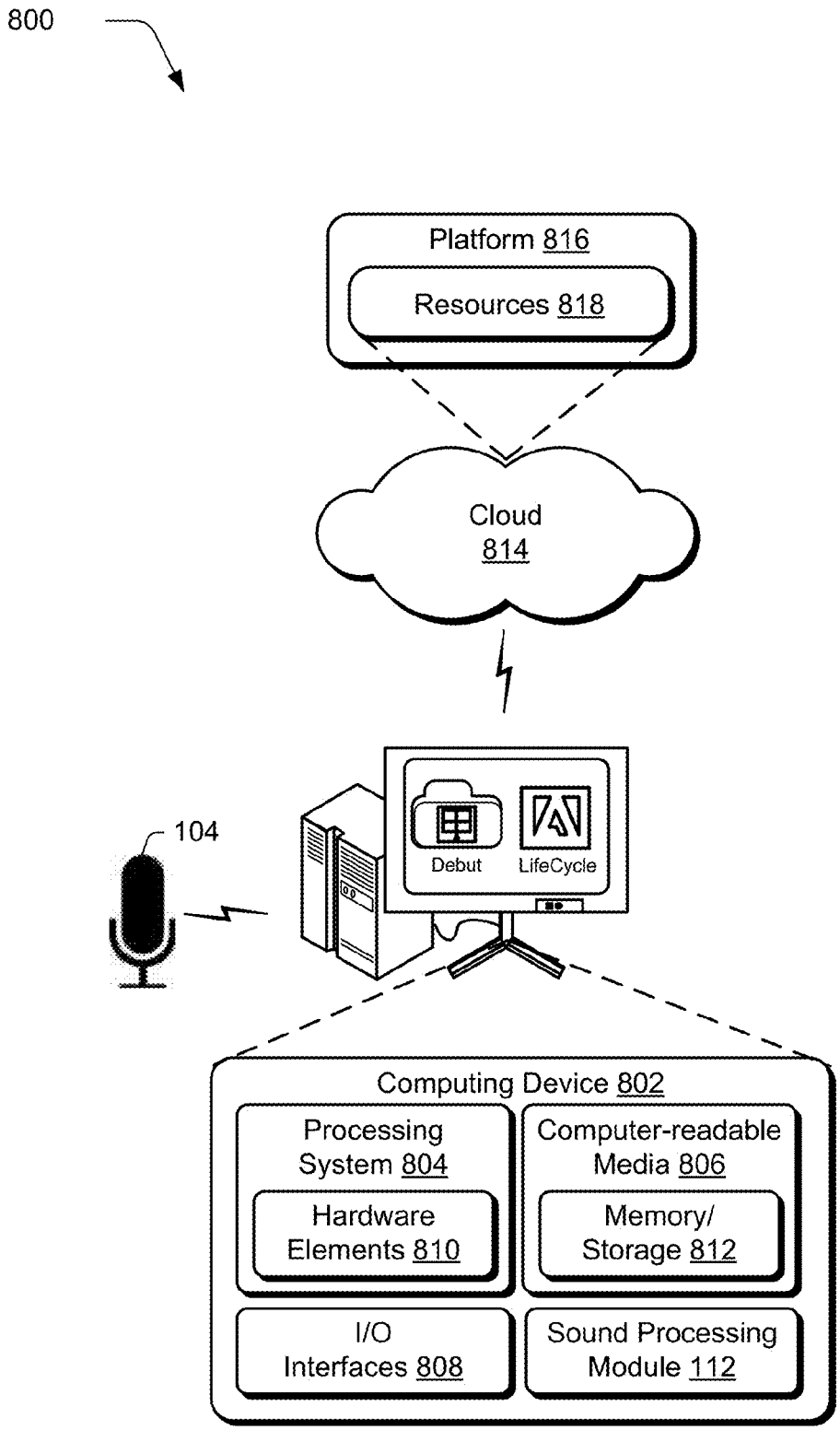
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the sound processing module 112, which may be configured to process sound data, such as sound data captured by an sound capture device 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 88 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   capturing, by the at least one computing device, temporal dependencies in sound data modeled through use of a recurrent neural network (RNN);
   extracting, by the at least one computing device, features from the sound data based on the captured temporal dependencies as a negative log-likelihood term of a nonnegative matrix factorization (NMF) cost using nonnegative matrix factorization (NMF); and
   performing, by the at least one computing device, one or more sound processing techniques on the sound data based at least in part on the extracted features.

2. A method as described in claim 1, wherein the recurrent neural network models the temporal dependencies in a temporal sequence of frames in the sound data.

3. A method as described in claim 2, wherein the frames are configured as part of a magnitude spectrogram.

4. A method as described in claim 2, wherein the frames are configured as vectors in an activity matrix.

5. A method as described in claim 2, wherein the recurrent neural network captures long-term temporal dependencies and event co-occurrence in the sound data.

6. A method as described in claim 5, wherein the long-term temporal dependencies describe a plurality of frames in the temporal sequence that includes a frame, a preceding frame, and at least one other frame.

7. A method as described in claim 1, wherein the RNN is employed as part of one or more time-dependent restricted Boltzmann machines (RBM) to describe multimodal conditional densities in the sound data.

8. A method as described in claim 1, wherein the recurrent neural network (RNN) is configured to capture the temporal dependencies by discovering an approximate factorization of an input matrix that describes an observed magnitude spectrogram of the sound data having time and frequency dimensions.

9. A method as described in claim 1, wherein the NMF is configured to utilize a Cosine distance as a cost distance in nonnegative matrix factorization to generate a likelihood that a respective sound source generated a respective portion of the sound data.

10. A method as described in claim 1, wherein the temporal information obtained using the recurrent neural network (RNN) is used as part of nonnegative matrix factorization (NMF) to predict plausibility of decomposition of sound data as part of the feature extraction.

11. A method as described in claim 10, wherein the predicted plausibility of decomposition of the sound data is predicted as a density of activity matrices used as part of nonnegative matrix factorization (NMF).

12. A system comprising:
at least one computing device having a processor and memory configured to perform operations comprising:
capturing temporal dependencies in sound data modeled through use of a recurrent neural network (RNN);
extracting features from the sound data based on the captured temporal dependencies as a negative log-likelihood term of a nonnegative matrix factorization (NMF) cost using nonnegative matrix factorization (NMF); and
performing one or more sound processing techniques on the sound data based at least in part on the extracted features.

13. A system as described in claim 12, wherein the recurrent neural network captures long-term temporal dependencies and event co-occurrence in the sound data.

14. A system as described in claim 13, wherein the long-term temporal dependencies describe a plurality of frames in the temporal sequence that includes the frame, the preceding frame, and the at least one other frame.

15. A system as described in claim 12, wherein the recurrent neural network (RNN) is configured to capture the temporal dependencies by discovering an approximate factorization of an input matrix that describes an observed magnitude spectrogram of the sound data having time and frequency dimensions.

16. A system as described in claim 12, wherein the NMF is configured to utilize a Cosine distance as a cost distance in nonnegative matrix factorization to generate a likelihood that a respective sound source generated a respective portion of the sound data.

17. A system comprising:
means for capturing temporal dependencies in sound data modeled through use of a recurrent neural network (RNN);
means for extracting features from the sound data based on the captured temporal dependencies as a negative log-likelihood term of a nonnegative matrix factorization (NMF) cost using nonnegative matrix factorization (NMF); and
means for performing one or more sound processing techniques on the sound data based at least in part on the extracted features.

18. A system as described in claim 17, wherein the recurrent neural network models the temporal dependencies in a temporal sequence of frames in the sound data.

19. A system as described in claim 18, wherein the frames are configured as part of a magnitude spectrogram.

20. A system as described in claim 18, wherein the frames are configured as vectors in an activity matrix.

21. A system as described in claim 18, wherein the recurrent neural network captures long-term temporal dependencies and event co-occurrence in the sound data.

* * * * *